(No Model.)

L. D. LOTHROP.
FISHING TACKLE.

No. 333,648. Patented Jan. 5, 1886.

WITNESSES:
Chas. G. Gooding
Henry Marsh

INVENTOR:
Llewellyn D. Lothrop,
by Sylvenus G. Walker
Atty.

UNITED STATES PATENT OFFICE.

LLEWELLYN D. LOTHROP, OF GLOUCESTER, MASSACHUSETTS.

FISHING-TACKLE.

SPECIFICATION forming part of Letters Patent No. 333,648, dated January 5, 1886.

Application filed October 8, 1885. Serial No. 179,367. (No model.)

*To all whom it may concern:*

Be it known that I, LLEWELLYN D. LOTHROP, of Gloucester, in the county of Essex and State of Massachusetts, have invented an Improvement in Fishing-Line Tackle, of which the following is a specification.

The object of my invention is to provide means whereby a fish-hook may be readily connected with or disconnected from a fishing-line, so that after a fish may have been caught and drawn out of the water the fish and hook both together may be detached from the line and another baited hook be readily connected with the line without stopping to remove the fish caught from the hook before setting the fresh-baited hook in the water. By this means a fisherman will be able to remove a fish from a hook or supply bait to such hook while the fishing-line, with one or more hooks attached to it, may be down in the water for the purpose of catching fish.

Figure 1:
Figure 3:
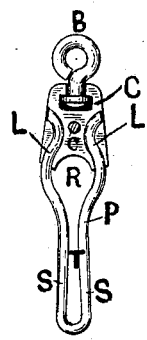
Figure 4:
Figure 5:
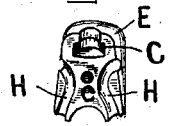
Figure 6:
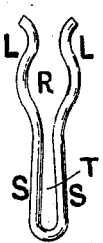
Figure 2:

Figure 1 represents a front elevation of a fish-hook and portion of a fishing-line, showing my invention connected therewith. Fig. 2 represents a side view of the same. Fig. 3 represents an elevation of my invention disconnected from the lines, and with one side clamp removed, showing the bent spring-loop and swivel in position within the opposite clamp. Fig. 4 represents a side elevation of the swivel-eye removed. Fig. 5 represents a view of the contacting face of one of the clamp-pieces, showing the grooves and cavities formed therein to receive the swivel and ends of the spring-wire loop. Fig. 6 represents a side elevation of the spring-wire loop removed.

A represents the main fishing-line, connected to the eye of the swivel B, suspended from its lower end in the usual manner. This swivel-eye B may be formed and bent from round wire, and provided with a washer riveted upon the shank end so as to form a head, as shown, or in any suitable manner desired.

The clamp-pieces E may be cast from brass or other metal, and provided at their top or upper end with a semicircular cavity, C, adapted to receive the straight shank and headed end portion of the said swivel B, as shown in Fig. 3. The said clamp-pieces E are also provided with the curved grooves H, adapted to receive the bent or curved ends L of the spring-wire loop P, which is formed as shown, and when placed between two clamp-pieces, as shown in Figs. 1 and 2, and a rivet, c, passed through a suitable hole formed in the said clamp-pieces B, all of the said parts are held and retained in position for use, as shown. It will be seen that the said spring-wire loop P is bent so as to permit the knot e of the gaging or connecting line D, secured to the fish-hook N, to pass through the enlarged opening R, which extends downward in a narrow passage, T, so as to permit the gaging-line to be forced or drawn downward therein, as shown, the knot upon the end of the same preventing its being drawn therefrom when being slid or drawn up or down through said contracted passage T, which may be tapering, or somewhat wider at the bottom than at the top, as shown, which construction enables the line D to be slid up or down through the said contracted passage easily without wearing the line, as the opposite straight side portions, S, yield or spring outward when the line is being drawn back and forth through the said contracted opening T of the said spring-wire loop P, as above described.

It will be evident that the swivel B may be omitted, and the said clamp-piece E provided with openings to receive the end of the main fishing-line A, if desired, or in any suitable manner.

Having thus described my invention, what I claim is—

1. The fishing-line tackle consisting of the clamp-pieces E, provided with cavities C, and curved grooves H, the swivel B, and the spring-wire loop P, secured at its ends between the said clamps, as and for the purposes set forth.

2. The fishing-line tackle consisting of the clamp-pieces E, provided with curved grooves H, and the spring-loop P, having its end portions secured between the clamp-pieces within the said grooves, as described.

LLEWELLYN D. LOTHROP.

Witnesses:
SYLVENUS WALKER,
WALTER WHITEMORE.